United States Patent [19]
Pieper

[11] 3,712,180
[45] Jan. 23, 1973

[54] BILATERAL SERVO CONTROLLED MANIPULATOR

[75] Inventor: Donald L. Pieper, Schenectady, N.Y.

[73] Assignee: General Electric Company

[22] Filed: Nov. 27, 1970

[21] Appl. No.: 93,223

[52] U.S. Cl. ................. 91/363, 91/217, 91/414, 91/445
[51] Int. Cl. ......... F01b 15/02, F15b 9/03, F15b 9/09
[58] Field of Search ........ 91/363 R, 363 A, 217, 414, 91/445

[56] References Cited

UNITED STATES PATENTS

3,263,824  8/1966  Jones et al. ..................... 91/363 R
3,411,410  11/1968  Westbury et al. ............... 91/363 A

*Primary Examiner*—Paul E. Maslousky
*Attorney*—Paul A. Frank, John F. Ahern, Louis A. Moucha, Julius J. Zaskalicky, Frank L. Neuhauser, Oscar B. Waddell and Joseph B. Forman

[57] ABSTRACT

A slave servo loop including an electrical amplifier, a flow control servo valve and a slave actuator connected between the control valve and a slave member is responsive when energized to a difference in the orientations of the slave member with respect to a master member for maintaining the slave member in alignment with the master member. A master servo loop is also provided including the aforementioned electrical amplifier, the aforementioned flow control servo valve, and a master actuator connected between the output of the control valve and the master member in a polarity to oppose, when energized, movement of the master member which produces movement of the slave member. On start-up of the manipulator, a lock valve connected in the lines between the control valve and the slave actuator hydraulically locks the slave actuator and hence the slave member. Any desynchronization of the slave member with the master member is eliminated by energization of the master servo loop which brings the master member into correspondence with the slave member. When the master member is substantially in alignment with the slave member, the slave lock valve is energized and allows the slave member to follow the movements of the master member.

5 Claims, 5 Drawing Figures

BILATERAL SERVO CONTROLLED MANIPULATOR

The present invention relates in general to bilateral servo controlled manipulators and in particular it relates to a bilateral electrohydraulic single valve servo control manipulator in which the movements of the control or master member produce corresponding movements amplified in respect to the force exerted thereby of a controlled or slave member and in which the force exerted by the slave member is reflected back to the master member reduced in magnitude.

In such manipulators, in which the slave and master members are mechanically decoupled on start up, it is necessary to align the orientation of the slave member with the master member to avoid whipping movements of the slave member in moving into alignment with the master member when power is applied.

The present invention is directed to the provision of means which automatically brings the slave and master members into alignment without such deleterious movement.

Another object of the present invention is to provide circuit means to lock automatically the master and slave member elements of the manipulator on shut down of the manipulator or in the event of loss of power to the electrical an hydraulic circuits of the manipulator.

In carrying out the present invention in accordance with one illustrative embodiment thereof, there is provided a master member having an axis aligned with a predetermined axis. A transducer is coupled to the master member to produce an output in accordance with the change in orientation with the axis of the master member in relation to the predetermined axis. A slave member is also provided having another axis aligned coaxially with another predetermined axis corresponding to the one predetermined axis. Another transducer is mechanically coupled to the slave member to produce an output in accordance with the change in orientation of the axis of the slave member in relation to the other predetermined axis. A slave servo loop including a electrical amplifier, a flow control servo valve and a slave actuator connected between said flow valve and said slave member is responsive, when energized, to a difference in outputs of said transducers for maintaining the slave member axis in alignment with the master member axis. Also provided is a master servo loop including the aforementioned electrical amplifier, the aforementioned flow control servo valve and a master actuator connected between the output of the control valve and the master member in a polarity to oppose, when energized, movement of the master member which causes movement of the slave member. A lock valve is connected in the lines from the control valve to the salve actuator for locking fluid in the slave actuator when the lock valve is deenergized and allowing fluid to flow in the slave actuator when the lock valve is energized. Another lock valve is connected in the lines from the control valve to the master actuator for locking fluid in the master actuator when the lock valve is deenergized and allowing fluid to flow in the master actuator when the lock valve is deenergized. Means are provided for energizing the control valve to cause the master member to move into alignment with the slave member. Means are also provided for energizing the slave lock valve after the master member is substantially in alignment with the slave member. Accordingly, when the slave and master members are out of alignment on start-up large movements of the slave and master members to attain alignment thereof are avoided.

The novel features which are believed to be characteristic of the present invention are set forth in the appended claims. The invention itself, however, together with further objects and advantages thereof may best be understood by reference to the following description taken in connection with the accompanying drawings wherein:

Figure 1:
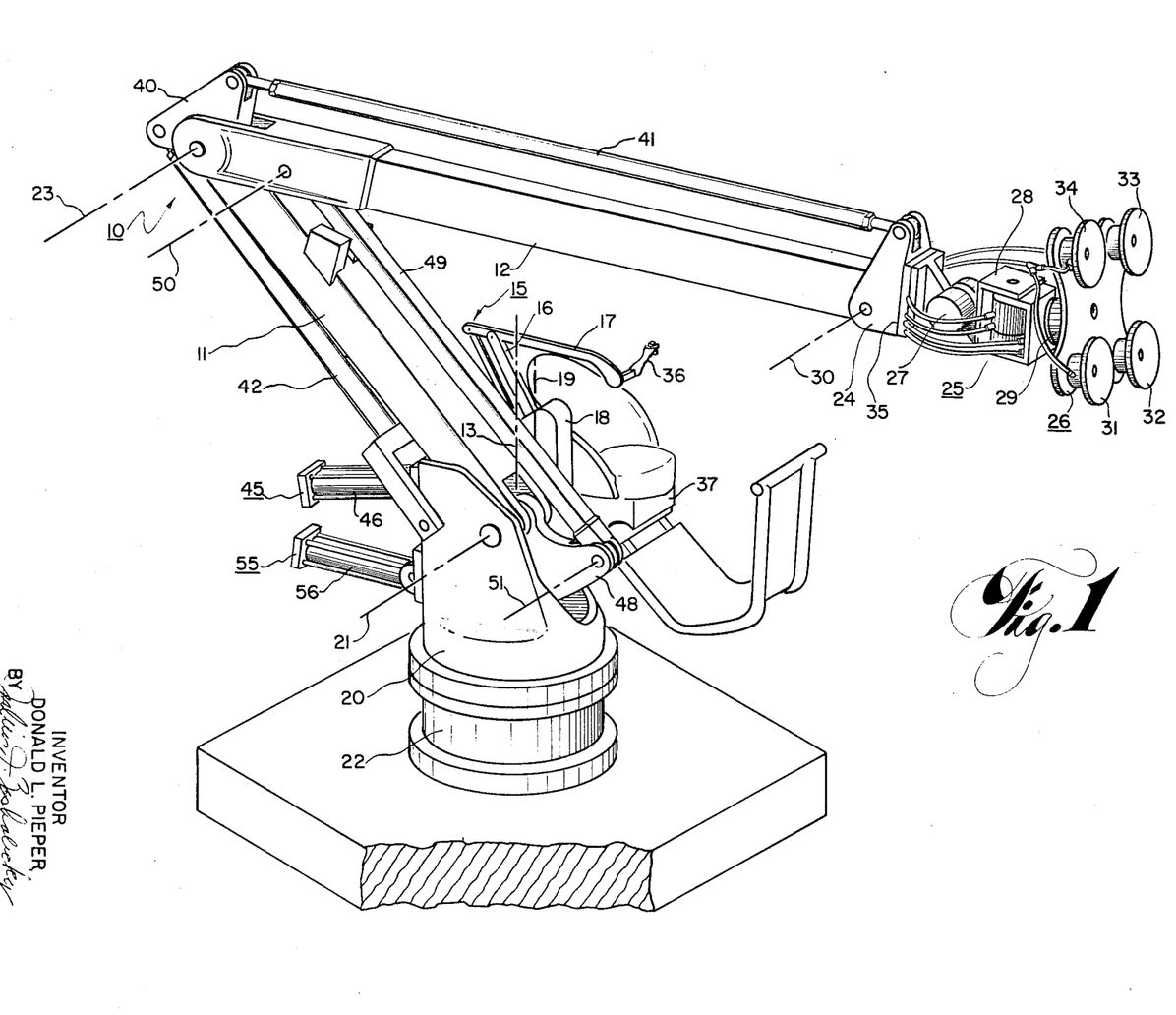
FIG. 1 is a perspective view of a manipulator to which the present invention is applied.
Figure 2:
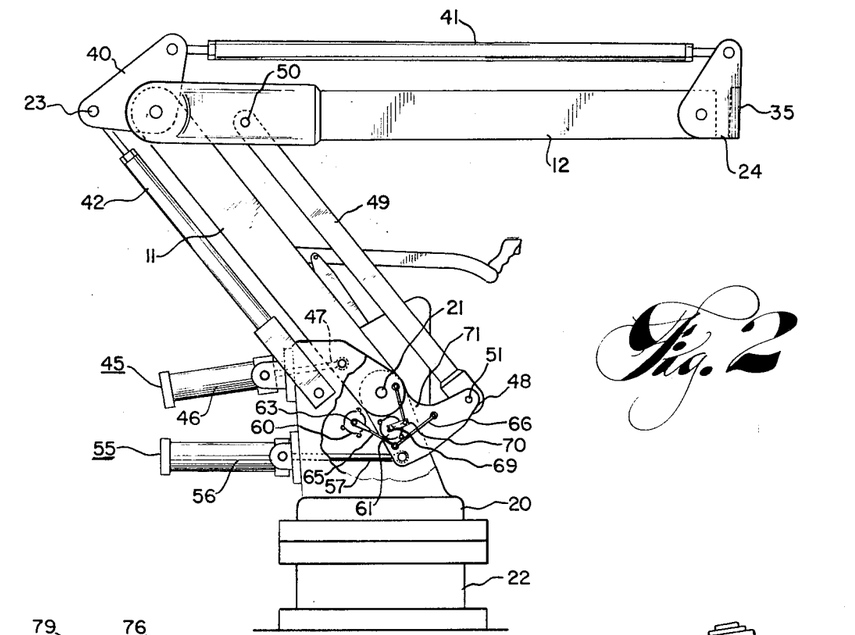
FIG. 2 is a side view of the manipulator of FIG. 1 showing in particular the elements of the slave member thereof.
Figure 3:
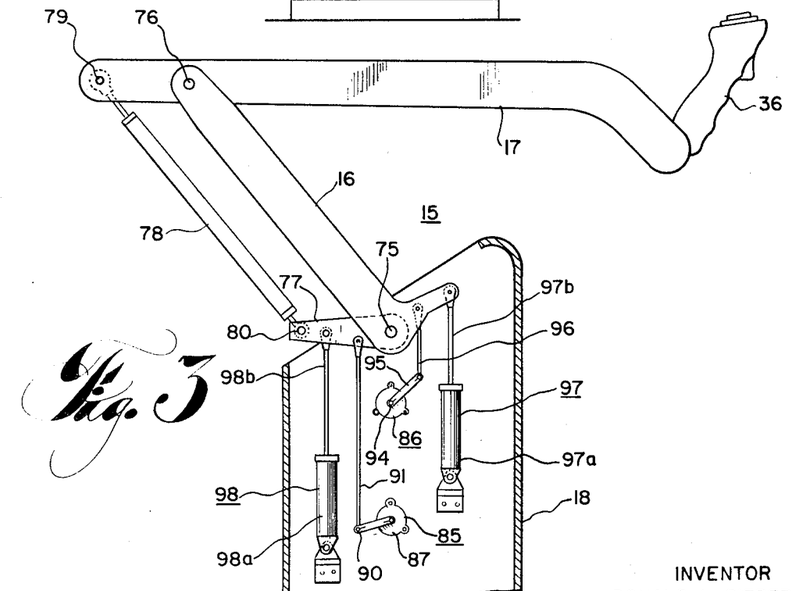
FIG. 3 is a side view of a portion of the master member assembly of the manipulator of FIG. 1 particularly showing the elements of the master member thereof.

The subject matter described in connection with FIGS. 1, 2, and 3 is also described and claimed in a copending application Ser. No. 76,814, filed Sept. 30, 1970, now U.S. Pat. No. 3,630,389 and assigned to the assignee of the present invention. FIGS. 1, 2, and 3 and the description thereof are provided to set forth the apparatus to which the invention of the present application is applied and the manner of application thereto.

Referring now to FIG. 1, there is shown a manipulator having an articulated boom or slave member 10 including an upper arm element 11 and a lower arm element 12. A control or master member 15 including an upper arm element 16 and a lower arm element 17 is also provided. One end of the upper arm element 11 of the slave member is pivotally connected to a slave support member 20 about a first horizontal axis 21 to form a shoulder joint. The slave support member 20 is supported in the bearing member (not shown) which is connected to a base or mount member 22. The support member 20 is pivotal on mount member 22 about a vertical axis 13 thereof by means (not shown) which may, for example, be such means as disclosed in copending patent application Ser. No. 33,442, filed Apr. 30, 1970, now U.S. Pat. No. 3,637,092 and assigned to the assignee of the present invention. The other end of the upper arm element 11 is pivotally connected to one end portion of lower arm element 12 to form an elbow joint and is pivotal about a second horizontal axis 23. The other end portion of the lower arm element has connected thereto an end support plate 24 pivoted about a horizontal axis 30, end effector positioning apparatus 25 secured to the plate 24, and end effector 26 secured to the positioning apparatus 25. The end effector positioning apparatus 25 comprises three rotary elements 27, 28, and 29 mechanically connected in series so as to permit movement of the end effector 26 about any one of three mutually perpendicular axes. The end effector 26 shown is one in which suction cups 31-34 are provided for interfacing and securing thereto objects to be moved by the manipulator. One end of the upper arm element 16 of the master control member is pivotally connected to a master support member 18 and is pivotal about a horizontal axis. The master support member 18 in turn is pivotally mounted on the slave support member and is displaced horizontally therefrom so as to be pivotal with respect thereto about a second vertical 19 axis. The other end of the upper arm element 16 is pivotally connected to one end of the lower arm element 17 and pivotal about another horizontal axis. Handle 36 is provided on the other end of the lower arm element 17 and includes buttons which are responsive to operator finger action to effect through appropriate electrical and hydraulic control elements (not shown) the operation of the end effector positioning elements 25 and the end effector 26. Also connected to the slave support member and displaced horizontally from the slave support member 20 so that the control member 15 is positioned between the operator of the manipulator and the slave member is a platform 37 or operator support member shown in the form of a seat for the operator and a foot rest so that the operator is oriented in the direction in which the end of the slave member is oriented and moves in azimuth so as to maintain such orientation.

The front face 35 of the end support plate 24 is automatically maintained perpendicular with respect to a horizontal plane by means of a pantograph assembly including a triangular plate 40 pivotal about the second horizontal axis 23 and a lower pantograph member 41 and an upper pantograph member 42. The lower pantograph member 41 is pivotally mounted at one end to the support plate 24 and at the other end to the triangular plate 40 so that bar member 41 is maintained parallel to the lower slave arm element 12. Similarly, the upper pantograph member 42 has one end pivotally mounted to the triangular plate 40 and the other forked end thereof mounted to the slave support member 20 so that the lower pantograph member 42 is maintained parallel to the upper slave arm element 11. The pivotal axes of the upper slave arm element 11 and the upper pantograph member 42 intersect a vertical plane through the longitudinal axes thereof which form the corners of a parallelogram. Similarly, the pivotal axes of the lower arm element 12 and the lower pantograph member 41 intersect a vertical plane through the longitudinal axes thereof which form the corners of a parallelogram. Such pantograph structure is described and claimed in a copending patent application Ser. No. 33,402, filed Apr. 30, 1970, now abandoned.

The upper slave arm element 11 is pivoted about the first horizontal or shoulder axis 21 by means of a hydraulic actuator 45 having a cylinder 46 pivotally mounted to the slave support member 20 and having a piston 47 assembly pivotally mounted to the upper arm member 11 as more clearly shown in FIG. 2. Means are provided for moving the lower slave arm element 12 about the second horizontal or elbow axis 23 and includes an intermediate member 48 and a lower arm support member 49. The intermediate member 48 is pivotally connected to the slave support member 20 so as to be pivotal about the first horizontal axis 21. The lower arm support member 49 has one end pivotally connected to the aforementioned one end portion of the lower arm element 12 and pivotal about a third horizontal axis 50 longitudinally spaced from the second horizontal axis 23. The other end of the lower arm support member 49 is pivotally connected to the intermediate member 48 and pivotal about a fourth horizontal axis 51. The third horizontal axis 50 lies between the second horizontal axis 23 and the other end of the lower slave arm element 12. The first, second, third and fourth horizontal axes 21, 23, 50 and 51 are parallel and intersect a vertical plane through the longitudinal axes of the lower slave arm element 12 and the upper arm element 11 at points forming the corners of a parallelogram.

The hydraulic actuator 55 having a cylinder element 56 pivotally mounted to the slave support 20 and having a piston element 57 pivotally mounted to the intermediate member 48 provides a means for pivotally moving the intermediate member about the first horizontal axis 21 to cause the lower arm element to execute a corresponding angular displacement about the second horizontal axis 23 as can be clearly seen by reference to FIG. 2. FIG. 2 is a side view of the manipulator of FIG. 1 in which the end effector positioning apparatus 25 and the end effector 26 have been eliminated and in which the organization of the mounting of the linear actuators 45 and 55 for effecting movement of the slave upper arm element 11 and slave lower arm element 12 are clearly shown.

Also shown in FIG. 2 are a pair of potentiometers 60 and 61 for providing electrical signals corresponding to the angular orientation of the lower slave arm element 12 and the upper slave arm element 11, respectively. The potentiometer 60 includes a housing to which the fixed resistive element 62 thereof is mounted and a shaft 63 to which a movable tap 64 is connected (See FIG. 4). The shaft 63 is pivotally linked by means of links 65 and 66 to the intermediate member 48. The pivotal axis of the shaft 63 of the potentiometer 60, the pivotal axes of links 65 and 66 and the horizontal axis 21 intersect a vertical plane through the longitudinal axis of the upper arm element 11 at points which form a parallelogram. Accordingly, a predetermined angular displacement of the intermediate member 48 about the first horizontal axis 21 corresponding to a predetermined angular displacement of the lower arm element 12 about the second horizontal axis 23 produces a predetermined angular displacement of the shaft 63 of the potentiometer about its axis. The potentiometer 61 also includes a housing to which the resistive element 67 thereof is mounted and a movable tap 68 connected to a shaft 69. The shaft 69 is pivotally mounted through pivotal links 70 and 71 to the slave upper arm element 11. The first horizontal axis 21, the axis of the shaft 69 of the potentiometer 61, and the pivotal axes of the links 70 and 71 intersect a vertical plane extending through the longitudinal axes of the upper slave arm element 11 at points which form the corners of a parallelogram. Accordingly, a predetermined angular displacement of the upper slave arm element 11 about the first horizontal axis 21 produces a corresponding angular displacement of the shaft 69 of the potentiometer 61.

Referring now in particular to FIG. 3, which is a side view of the master control arm assembly of FIG. 1 showing the organization of the elements thereof. The upper arm element 16 of the master control arm member 15 is pivotally connected to a master support member 18 and is pivotal about a fifth horizontal axis 75. The master support member 18 in turn is pivotally mounted to the slave support member by means (not shown) and may be such means as disclosed in the aforementioned U.S. Pat. No. 3,637,092. The pivotal mounting point of member 18 is displaced horizontally from the slave support member 20 so as to be pivotal with respect thereto about the second vertical axis 19. The other end of the upper arm element 16 is pivotally connected to an intermediate point on the lower arm element 17 and pivotal about a sixth horizontal axis 76. A second intermediate member 77 is provided pivotally connected to the master support member 18 and pivotal about the fifth horizontal axis 75. A link member 78 is provided having one end pivotally connected to one end of the master lower arm element 17 adjacent the sixth pivotal axis 76 thereof and pivotal about a seventh horizontal axis 79. The other end of the link member 78 is pivotally connected to the second intermediate member 77 and pivotal about an eighth horizontal axis 80. The fifth, sixth, seventh, eighth horizontal axes are parallel and intersect in a vertical plane through the longitudinal axes of the elements 16 and 17 at points which form the corners of a parallelogram. According as the control member 15 is moved, the upper arm element 16 and the lower arm element 17 are pivoted about the fifth and sixth horizontal axes 75 and 76, respectively. The movement of the upper arm element 16 is sensed by means of a potentiometer 85 and movement of the lower arm element 17 is sensed by the potentiometer 86. The potentiometer 85 includes a housing in which the resistive element 87 thereof is mounted and a slidable tap 88 connected to a shaft 89. The housing of the potentiometer 85 is mounted to the master support assembly 18 and the shaft 89 is pivotally connected by means of links 90 and 91 to the second intermediate member 77 at a point displaced from the fifth horizontal axis 75. The fifth horizontal axis 75, the axis of the shaft 89 of the potentiometer, and the axes associated with the links 90 and 91 intersect a vertical plane through the longitudinal axis of the lower arm element in points which form the corners of the parallelogram. Accordingly, a given displacement of the lower arm element 17 about the sixth horizontal axis 76 produces a corresponding rotation of shaft 89 of the potentiometer about its axis. The potentiometer 86 also includes a housing connected to the master support member 18 and includes mounted therein a resistive element 92 and a slidable tap 93. The tap 93 is connected to a shaft 94 which is pivotally linked through links 95 and 96 to the upper master arm element 16. The fifth horizontal axis 75, the axis of rotation of the shaft 94 and the pivotal axes of the links 95 and 96 intersect a vertical plane through the upper master element 16 at points which form the corners of a parallelogram. Accordingly, a predetermined angular displacement of the upper master element 16 produces a corresponding angular displacement of the shaft 94 of the potentiometer 86. Upper arm element master actuator 97 is provided having a cylinder 97a pivotally mounted to the master support assembly 18 and having a piston 97b pivotally mounted to the upper arm element 16. The master actuator 97 is connected in the fluid circuit of the system in parallel with the slave actuator 45, phased, however, to oppose the motion of the upper master arm element 16 which produced the force in the slave actuator 45 as will be more fully described in connection with FIG. 4. A lower arm element master actuator 98 is also provided having a cylinder 98a pivotally mounted to the master support assembly 18 and having a piston 98b pivotally mounted to intermediate member 77. The master actuator 98 is connected in the fluid circuit of the system in parallel with the slave actuator 55, phased however, to oppose the motion of the lower master arm element 17 which produced the force in the slave actuator 55 as will be more fully described in connection with FIG. 4.

Figure 4:
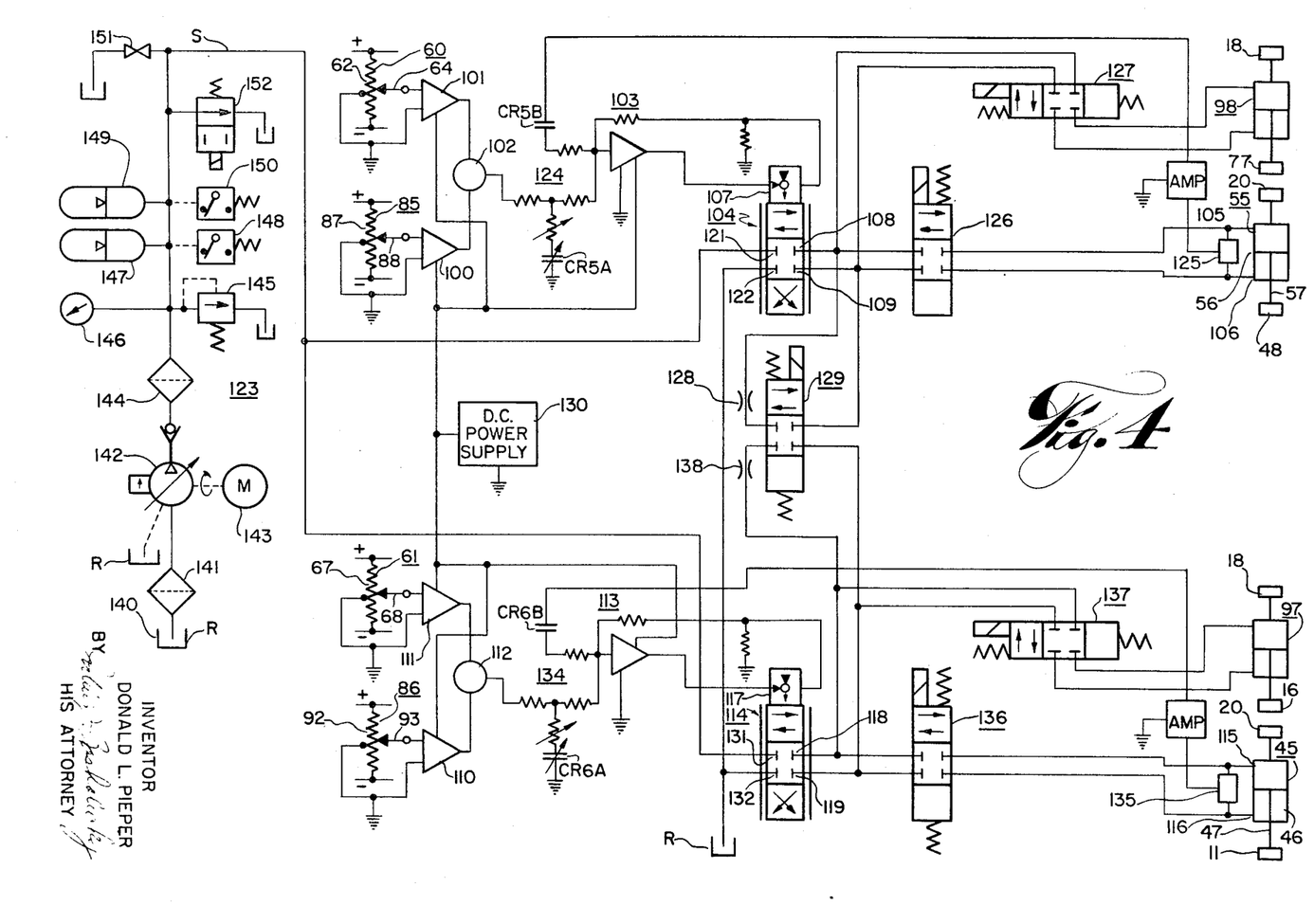
FIG. 4 is a schematic diagram of the hydraulic system and a portion of the electrical system of the manipulator of FIGS. 1, 2, and 3.

Referring now in particular to FIG. 4, there is shown a servo system in schematic form responsive to the electrical signals developed at the electrical output of the lower slave arm potentiometer 60 of FIG. 2 and the lower master arm potentiometer 85 of FIG. 3 for energizing the lower slave arm actuator 55 to bring the lower slave arm element 12 into correspondence with the orientation of the lower master arm element 17. One such servo system is described and claimed in a copending application Ser. No. 76,562, filed Sept. 29, 1970, now U.S. Pat. No. 3,626,809 and assigned to the assignee of the present invention. Each of the elements of FIG. 4 identical to the elements of FIGS. 2 and 3 are denoted by the same numeral. The servo system includes the master potentiometer 85, slave potentiometer 60, the master amplifier 100, the slave amplifier 101, a summing network 102, a current amplifier 103, fluid flow control valve 104 and the slave linear fluid actuator 55. The potentiometer 60 includes a resistive element 62 having positive and negative terminal and center taps and includes a slidable tap 64 which is coupled to the shaft of the potentiometer and moves in accordance therewith to provide a voltage output, the polarity and magnitude of which with respect to the center tap varies in accordance with the magnitude and direction of displacement of the shaft 63 in respect to a predetermined reference direction. Similarly, the master potentiometer 85 includes a resistive element 87 having a positive terminal, a negative terminal and a center tap. It also includes a variable tap 88 which is mechanically coupled to the shaft 89 of the potentiometer. Accordingly, as the shaft of the potentiometer is angularly displaced from a predetermined reference direction an output is developed between the center tap and the movable tap, the magnitude and direction of which corresponds to the magnitude and direction of displacement of the shaft from the predetermined reference orientation. The slave linear actuator 55 includes a cylinder member 56 and a piston assembly 57. The cylinder 56 is pivotally connected to the slave support member 20 and the piston assembly 57 is pivotally connected to the intermediate member 48. A port 105 is provided at one end and another port 106 is provided at the other end of the cylinder 55 for directing fluid in one direction or the other in the cylinder to cause the piston assembly 57 to move therein in one direction or the other. The electrohydraulic fluid flow control valve 104 includes a current input circuit 107 and a pair of fluid output ports 108 and 109, a pressure source port 121 and a fluid return port 122. The pressure source port 121 is connected to the pressure port S of pressure source 123 and the fluid return port 122 is connected to the fluid return R for the source 123. The valve 104 provides a flow or pressure output at the output ports thereof the magnitude and direction of which in respect to the output ports is a function of the magnitude and direction of the current applied to the input circuit of the control valve. Each of the output ports 108 and 109 is connected to a respective port of the actuator 55. The output of the master potentiometer 85 is applied to the input of the master amplifier 100 and similarly the output of the slave potentiometer 60 is applied to the input of a slave amplifier 101. The outputs from the amplifiers 100 and 101 are applied to the summing network 102 which develops a difference output, the magnitude and polarity of the difference depending upon the difference of the signals obtained from the potentiometers 60 and 85 and corresponding to the magnitude and direction of displacement of the slave element 12 with respect to the master element 17. The output from the summing network is applied to current amplifier 103, the output of which in turn is applied to the input circuit 107 of the control valve 104 to develop at the output ports of the control valve a flow or pressure output, the magnitude and direction of the difference in the signals obtained from the potentiometers 60 and 85. The pressure output from the control valve is applied to the actuator 55 in a direction to cause the actuator to move the slave element 12 in a direction to reduce the displacement of the slave element 12 with respect to the master element 17 and hence into correspondence therewith.

A T-type attenuation network 124 is provided between the output of the summing network 102 and the input of the current amplifier 103. The attenuation network is controlled by a relay CR5 having a normally closed contact CR5A connecting the leg thereof to ground. Accordingly, when the relay CR5 is deenergized, the network 124 is connected in circuit and provides attenuation. When the relay CA5 is energized, the leg of the network 124 is disconnected from ground and the current amplifier operates at high or normal gain. A pressure transducer or sensor 125 is connected across the supply lines to the slave actuator 55 and develops a pressure signal which is amplified and applied through normally opened contacts CR5B of relay CR5 to the input of the current amplifier 103 to provide stabilization of the slave servo loop. When the relay CR5 is energized the contacts CR5B close and pressure signal feedback is applied to the current amplifier 103 to stabilize operation of the loop in the high gain mode of operation. The output of the control valve 104 is also applied to the master actuator 98. The output is phased in a direction to cause the actuator 98 to move the lower arm element 17 in a direction opposed to the direction which produce the corresponding movement in the lower slave arm element 12.

Figure 5:
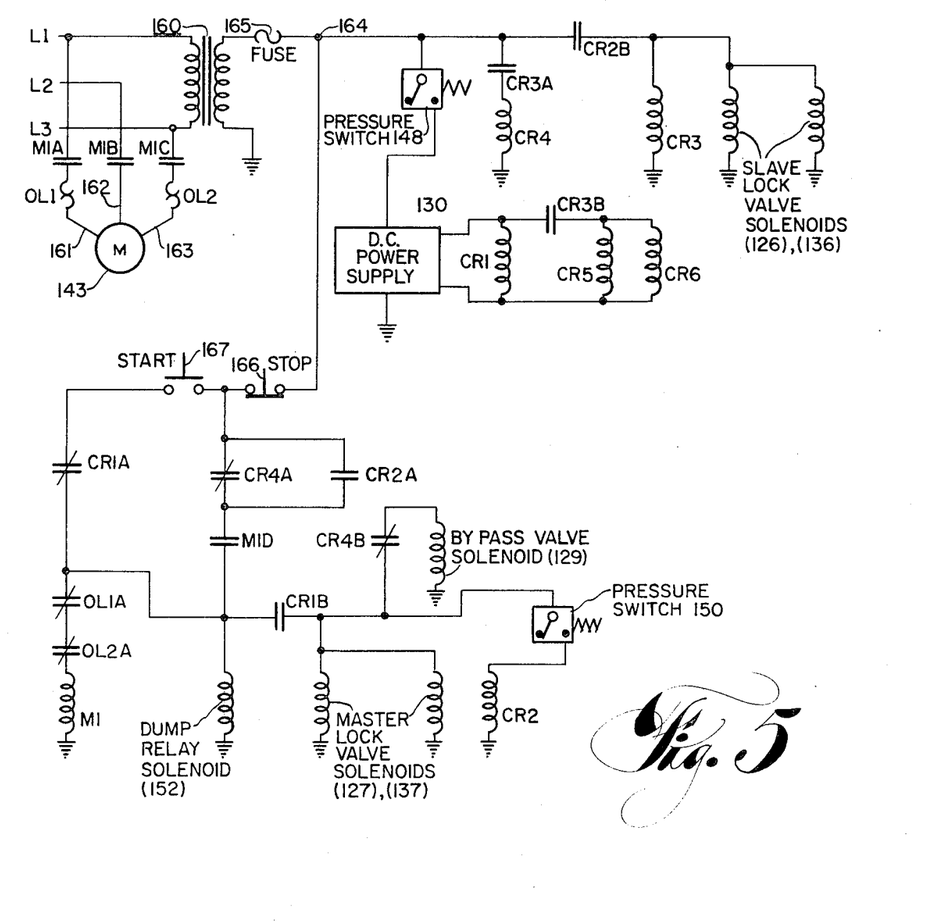
FIG. 5 is a schematic diagram of the electrical control circuits of the manipulators of FIGS. 1, 2, 3, and 4.

Connected between the output ports of the control valve 104 and the slave actuator 55 is a slave lock valve 126, a solenoid operated four-way directional valve, in which are provided a pair of parallel flow paths which are blocked when the lock valve is deenergized. Similarly, a master lock valve 127, a solenoid operated four-way directional valve, is provided in the lines from the output ports of the control valve 104 to the master actuator 98 and having a pair of flow paths which block the flow of fluid from the control valve to the actuator in the absence of energization of the lock valve and are open when the lock valve is energized. Also, there is provided an orifice 128 connected across the output ports of the control valve through a flow path of a by-pass valve 129 and a solenoid operated four-way directional valve. When the by-pass valve 129 is energized, the orifice 128 is connected across the output ports of the control valve 104. When the by-pass valve 129 is deenergized, fluid flow therethrough is blocked and the orifice 128 is removed from circuit. The manner of energizing and deenergizing of the valves 126, 127 and 129 will be explained below in connection with the electrical switching diagram of FIG. 5. A d-c power supply 130 energized from the a-c source for the manipulator as will be described in connection with FIG. 5 provides d-c power to the electrical circuits of the manipulator.

Also shown in FIG. 4 is the servo system in the upper master and slave arm elements responsive to the electrical signals developed at the electrical output of the upper slave arm potentiometer 61 of FIG. 2 and the upper slave arm actuator 45 to bring the upper slave arm 11 into correspondence with the orientation of the upper master arm element 16. The servo system for the upper arm elements is similar to the servo system for the lower arm elements. The servo system includes the master potentiometer 86, slave potentiometer 61, the master amplifier 110, the slave amplifier 111, a summing network 112, a current amplifier 113, a fluid flow control valve 114 and the slave linear fluid actuator 45. The potentiometer 61 includes a resistive element 67 having positive and a negative terminal and a center tap and includes a slidable tap 68 which is mechanically coupled to the shaft 69 of the potentiometer and moves in accordance therewith to provide a voltage output, the polarity and magnitude of which with respect to the center tap varies in accordance with the magnitude and direction of displacement of the shaft 69 in respect to a predetermined reference direction. Similarly, the master potentiometer 86 includes a resistive element 92 having a positive terminal, a negative terminal and a center tap. It also includes a variable tap 93 which is mechanically coupled to the shaft 94 of the potentiometer 86. Accordingly, as the shaft of the potentiometer 86 is angularly displaced from a predetermined reference direction an output is developed between the center tap and the movable tap, the magnitude and direction of which corresponds to the magnitude and direction of displacement of the shaft from the predetermined reference direction. The slave linear actuator 45 includes a cylinder member 46 and a piston assembly 47. The cylinder 46 is pivotally connected to the slave support member 20 and the piston assembly 47 is pivotally connected to the upper slave arm element 11. A port 115 is provided at one end and another port 116 is provided at the other end of the cylinder 45 for directing fluid in one direction or the other in the cylinder to cause the piston assembly 87 to move therein in one direction or the other. The electrohydraulic fluid flow control valve 114 includes a current input circuit 117 and a pair of fluid output ports 118 and 119, a pressure source port 131 and a fluid return port 132. The pressure source port 131 is connected to the port S of pressure source 123 and the fluid return port 132 is connected to fluid return port R of the source. The valve 114 provides a flow or pressure output at the output ports thereof the magnitude and direction of which in respect to the output ports is a function of the magnitude and direction of the current applied to the input circuit of the control valve. Each of the output ports 118 and 119 is connected to a respective port of the actuator 45. The output of the master potentiometer 86 is applied to the input of the master amplifier 110 and similarly the output of the slave potentiometer 61 is applied to the input of a slave amplifier 111. The outputs from the amplifiers 110 and 111 are applied to the summing network 112 which develops a difference output, the magnitude and polarity of the difference depending upon the magnitude and polarity of the difference of the signals obtained from the potentiometers 61 and 86 and corresponding to the magnitude and direction of displacement of the slave element 11 with respect to the master element 16. The output from the summing network 112 is applied to a current amplifier 113, the output of which in turn is applied to the input circuit 117 of the control valve 114 to develop at the output of the control valve a flow or pressure output the magnitude and direction of which is dependent upon the magnitude and direction of the difference in the signals obtained from the potentiometers 61 and 86. The pressure output from the control valve is phased or applied to the linear actuator 45 in a direction to cause the actuator to move the slave element 11 in a direction to reduce the displacement of the slave element with respect to the master element 16 and hence into correspondence therewith.

A T-type attenuation network 134 is provided between the output of the summing network 112 and the input of the current amplifier 113. The attenuation network is controlled by a relay CR6 having a normally closed contact CR6A connecting the leg thereof to ground. Accordingly, when the relay CR6 is deenergized, the network 134 is connected in circuit and provides attenuation. When the relay CA6 is energized, the leg of the network 134 is disconnected from ground and the current amplifier operates at high or normal gain. A pressure transducer or sensor 135 is connected across the supply lines to the slave actuator 45 and develops a pressure signal which is amplified and applied through normally opened contacts CR6B of relay CR6 to the input of the current amplifier 113 to provide stabilization of the slave servo loop. When the relay CR5 is energized the contacts CR6B close and pressure signal feedback is applied to the current amplifier 113 to stabilize operation of the loop in the high gain mode of operation. The output of the control valve 114 is also applied to the master actuator 97. The output is phased in a direction to cause the actuator 97 to move the upper arm element 16 in a direction opposed to the direction which produces the corresponding movement in the upper slave arm element 11.

Connected between the output ports of the control valve 114 and the slave actuator 45 is a slave lock valve 136, a solenoid operated four-way directional valve, in which are provided a pair of parallel flow paths which are blocked when the lock valve is deenergized. Similarly, a master lock valve 137, a solenoid operated four-way directional valve, is provided in the lines from the output ports of the control valve 114 to the master actuator 97 and having a pair of flow paths which block the flow of fluid from the control valve 114 to the actuator 97 in the absence of energization of the lock valve and are open when the lock valve is energized. Also, there is provided an orifice 138 connected across the output ports of the control valve 114 through another flow path of a by-pass valve 129 and a solenoid operated four-way directional valve. When by-pass valve 128 is energized, the orifice 138 is connected across the output ports of the control valve 114. When the by-pass valve 129 is deenergized, fluid flow therethrough is blocked and the orifice 138 is removed from circuit. The manner of energizing and deenergizing of the valves 136, 137 and 129 will be explained below in connection with the electrical switching diagram of FIG. 5.

The hydraulic power supply 123 for the system is shown in the left hand portion of FIG. 4. Fluid from the reservoir 140 is pumped through a filter 141 by the pump 142 which is driven by a motor 143. The output of the pump 142 is applied through a check valve 144 and another filter 145 to the supply lines or ports S of the power supply 123. Connected between the filter 144, and the lines S supplying fluid to the various actuators and valves of the system are a pressure relief valve 145, a pressure meter 146, a first accumulator 147 which stores fluid at low pressure, for example 10 lbs. per square inch, a pressure actuated switch 148 set to become actuated at a low pressure below the pressure at which the accumulator 147 stores fluid, a second accumulator 149, responsive to a much higher pressure than first accumulator 147 for storing fluid, a pressure actuated switch 150 which is set to be actuated at the high pressure, for example 1,000 lbs. per square inch, the operating pressure of the system. The capacity of the first or low pressure accumulator 147 allows a short time delay, for example, a few seconds, between the operation of the switches 150 and 148 and assures proper sequencing of the relays of FIG. 5 as will be explained below. A manual dump switch 151 and a solenoid operated dump or release switch 152 are also provided at the output end of the power supply 123.

FIG. 5 is a schematic diagram of the electrical circuits of the system for starting, operating and stopping the manipulator of FIGS. 1, 2, 3 and 4. The components of FIG. 5 identical to the components shown in FIGS. 1, 2, 3 and 4 are designated by the same reference symbol. The motor 143 used to drive the pump 142 is a three phase motor having terminals 161, 162 and 163, each connected to a respective one of lines L1, L2 and L3 of a three phase power supply system through respective normally open contacts M1A, M1B and M1C of a motor relay M1. Connected between the terminal 161 and line L1 is the current sensitive element OL1 of a time delay current overload relay OL1, the normally closed contacts OL1A of which are connected in the start circuit for the motor 143 as will be described below. Similarly, the current sensitive element OL2 of another time delay current overload relay OL2 is connected between the terminal 163 and the line L3, the normally closed contacts OL2A of which are connected in the start circuit for the motor 143.

A transformer 160 is provided having a primary winding connected between the lines L1 and L3 and a secondary winding connected between ground and the a-c supply terminal 164 through a fuse 165. Connected between the a-c supply terminal 164 and ground in the order named are a normally closed manually operated stop switch 166, a normally opened manually operated start switch 167, normally closed contacts CR1A of control relay CR1, normally closed contacts CR1A of overload relay OL1, normally closed contacts OL2A of overload relay OL2 and the solenoid M1 of the motor relay M1, the respective normally open contacts M1A, M1B and M1C of which are connected as described above in the supply lines to the motor 143. The solenoid of the dump relay 152 is connected between the junction of the set of contacts CR1A and the overload relay contacts OL1A to ground. The start switch 167 and the normally closed contacts CR1A are bypassed by serially connected normally closed contacts CR4A of relay CR4 and normally open contacts M1D of motor relay M1.

When the start switch 167 is depressed, the solenoid M1 of the motor relay M1 is energized thereby closing contacts M1A, M1B, M1C and M1D, and applying power to the motor 143 which initiates the buildup of pressure by the pump 142 in the accumulators 147 and 149. The pressure switch 148 is set to operate at a low pressure and its closure applies a-c power to the d-c power supply 130 which is connected in circuit with the switch 148 between the a-c terminal 164 and ground. The energization of the d-c power supply 130 energizes the solenoid CR1 of the control relay CR1 which causes normally open contacts CR1B to close and normally close contacts CR1A to open. The closure of normally open contacts CR1B connects the solenoids of master lock valves 127 and 137 between the a-c terminal 164 and ground, provides energization to the solenoid of the by-pass valve 129 which is connected through normally closed contacts CR4B of relay CR4 to the terminal 164, and also connects the solenoid CR2 of the relay CR2 through pressure operated switch 150 to the a-c terminal 164. After application of the power to the motor 143 and the build up of pressure to normal operating pressure, the pressure switch 150 is actuated causing the a-c power to be applied to the control relay CR2. The application of power to relay CR2 causes contacts CR2A connected in shunt with normally closed contacts CR4A of relay CR4 to become closed and causes normally open contact CR2B to become closed. Closure of contacts CR2B applies energization to the solenoids of upper and lower slave arm lock valves 136 and 126 and also to the solenoid CR3. Actuation of the solenoid CR3 causes normally open contacts CR3A to be closed connecting solenoid of relay CR4 to the terminal 164. Accordingly, normally closed contacts CR4A are opened. Also, normally closed contacts CR4B are opened thereby removing energization from the solenoid of by-pass valve 129. The closure of normally open contacts CR3B connects the solenoids CR5 and CR6 across the d-c lines thereof. Actuation of solenoid CR5 causes the normally open contacts CR5A to be closed and normally closed contacts CR5B to be opened. Similarly, the actuation of the solenoid CR6 causes the normally opened contacts CR6A to be opened and the normally opened contacts CR6B to be closed. Contacts CR5A and CR5B, and contacts CR6A and CR6B are associated with the attenuation networks 124 and 134 described in FIG. 4.

With the pump motor 142 stationary, no hydraulic pressure appears at the lines S of the hydraulic power supply 123. Accordingly, the master member 15 and slave member 10 are locked in position by the locking of fluid in the actuators thereof. As the pressure switch 148 is open, a-c power is not applied to the d-c power supply 130 and the relay CR1 is deenergized. Consequently, the solenoid of relay CR2 is also deenergized as it is connected through pressure actuated switch 150 and through the normally open contact of relay CR1B to the a-c supply line.

When the start switch 167 is depressed, the motor starter relay M1 and the dump solenoid DR1 are energized thereby energizing the pump 142 and enabling pressure to build up in the supply lines S. When the pressure in the supply lines reaches the pressure level for which pressure switch 148 is set to operate, the normally opened contacts thereof are closed and a-c power is applied to the d-c power supply 130. The appearance of d-c voltage at the output of the d-c power supply energizes the solenoid of the relay CR1. Energization of the relay CR1 causes the energization of the solenoids of the master lock valves 127 and 137 and the by-pass valve 129. Accordingly, fluid paths are provided through orifices 128 and 138 between the output ports of the servo valves 104 and 114. At this time the electrical channels including the amplifiers which drive the control valves 104 and 114 are energized and the slave elements 11 and 12 are locked as the solenoids of the slave lock valves 126 and 136 are still deenergized. Accordingly, the master elements 16 and 17 are driven to synchronization or alignment with the corresponding slave elements 11 and 12. As the relay CR5 is not yet energized the servo loops including the amplifiers 103 and 113 are in the low gain mode of operation. This condition is necessary as the slave lock valves 126 and 136 lock out the pressure transducers 125 and 135 from operation in the system and without pressure feedback the master servo loops would be unstable at normal gain. The orifices 128 and 138 also help to stabilize the master servo loops during start up as they load the control valves 104 and 114. As the pressure builds up, the master elements 16 and 17 are driven into synchronization or alignment with the corresponding elements of the slave member. This action takes a few seconds as the low pressure accumulator 147 is pressurized.

When the pressure in the supply lines S reaches the operating pressure, for example, a thousand pounds per square inch, the pressure switch 150 closes, energizing the relay CR2. The contacts of CR2 cause the energization of the relay CR3 which connects the upper and lower slave lock solenoids to the a-c terminal 164. Accordingly, the elements of the slave member are unlocked. Closure of contacts CR3A energizes relay CR4 and causes normally closed contacts CR4B to be opened and hence closure of by-pass valve 129. Closure of normally open contacts CR3B applies energization to relays CR5 and CR6. Actuation of relay CR5 increases the gain of the amplifier 103 to normal gain and establishes pressure feedback to the input thereof as explained above in connection with FIG. 4. Similarly, actuation of relay CR5 increases the gain and establishes pressure feedback to the input thereof. In addition, the manipulator is now connected into its operating mode through contact CR2A and contacts M1D.

If hydraulic supply pressure drops below the operating value, the relay CR2 is deenergized and causes the motor 143 to stop, the dump valve 152 to open and both master and slave members to be locked. If d-c power disappears, the relay CR1 is deenergized which deenergizes relay CR2 and the system shuts down as in the case of loss of operating pressure. Similarly, if a-c power fails, the system shuts down as in the case of loss of operating pressure. Note that the system cannot be restarted until the pressure drops below the pressure at which switch 148 is actuated as contacts CR1A are opened and as long as the d-c power supply 130 supplies power, such contacts are maintained open. The only way in which the contacts CR1A can be closed to permit the system to be started up again is for the pressure switch 148 to open which means that the pressure has to drop below the turn on pressure of the switch 148.

While the invention has been described in specific embodiments it will be appreciated that modifications may be made by those skilled in the art and we intend by the appended claims to cover all such modifications as fall within the true spirit and scope of the invention.

What I claim as new and desire to secure by Letters Patent of the United States is:

1. A bilateral servo system comprising
   a master member having an axis aligned coaxial with a predetermined axis,
   a transducer coupled to said master member to produce an output in accordance with the change in orientation of the axis of said master member in relation to said predetermined axis,
   a slave member having another axis aligned coaxial with another predetermined axis corresponding to said one predetermined axis,
   another transducer mechanically coupled to said slave member to produce an output in accordance with the change in orientation of the axis of said slave member in relation to said other predetermined axis,
   a slave servo loop including an electrical amplifier, a servo flow control valve and a slave actuator connected between said valve and said slave member responsive, when energized, to a difference in outputs of said transducers for maintaining said slave member axis in alignment with said master member axis,
   a master servo loop including said electrical amplifier, said servo flow control valve and a master actuator connected between the output of said valve and said master member in a polarity to oppose, when energized, movement of said master member which causes movement of said slave member,
   a slave lock valve connected in the lines from the control valve to the slave actuator for lacking fluid in the slave actuator when the lock valve is de-energized and allowing fluid to flow in the slave actuator when the lock valve is energized,
   a first energizing means for energizing said control valve to cause said master member to move into alignment with said slave member,
   a second energizing means for energizing said slave lock valve after said master member is substantially in alignment with said slave member,
   whereby when said slave and master members are out of alignment on start-up, large movements of said slave member and master member to attain alignment thereof are avoided.

2. The combination of claim 1 in which is included
   a master lock valve connected in the lines from the control valve to the master actuator for locking fluid in the master actuator when the lock valve is de-energized and allowing fluid to flow in the master actuator when the lock valve is energized, and in which said first energizing means includes means for energizing said master lock valve as well as said control valve.

3. The combination of claim 1 in which means are provided to maintain the gain of the master loop substantially below normal gain while said slave lock valve is de-energized and to return the gain of the master loop to normal gain when said slave lock valve is energized.

4. The combination of claim 3 in which said gain controlling means includes an orifice and a switching valve connected across the output ports of said control valve, said switching valve being open when energized and closed when de-energized, said switching valve being energized when said control valve and said master lock valve are energized and de-energized when said slave lock valve is energized.

5. The combination of claim 3 in which slave and master loops include a common current amplifier and in which said gain controlling means includes circuit means for substantially reducing the gain of the amplifier when said control valve and said master lock valve are energized and for returning the gain to normal gain when said slave lock valve is energized.

* * * * *